United States Patent Office 3,410,809
Patented Nov. 12, 1968

3,410,809
CN COMPOUNDS
Iral B. Johns, Marblehead, Mass., assignor to Monsanto Research Corporation, St. Louis, Mo., a corporation of Delaware
No Drawing. Continuation-in-part of application Ser. No. 323,110, Nov. 12, 1963. This application May 28, 1965, Ser. No. 459,874
12 Claims. (Cl. 260—2)

This application is a continuation-in-part of co-pending application S.N. 323,110, filed Nov. 12, 1963, now abandoned.

This invention relates to new chemicals and methods for their synthesis, and more particularly, provides novel compounds in which an element of Groups III to V of the Periodic Table is joined successively to C and N, and methods of making the same.

The cyano (nitrile) group, —C≡N, as a substituent of organic compounds can be converted by various methods, such as acid or base catalysis, to the divalent linking unit, —C=N—. The products of such conversion are polymers. These may be oligomers (low molecular weight polymers) such as triazines:

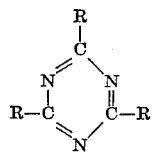

where R is an organic radical. They may also be higher molecular weight polymers. Organic nitriles including monofunctional nitriles can form polymers, which are assigned the structure

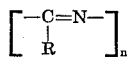

where R is an organic radical and $n$ is an integer with a value of 4 or more, which may or may not be cyclic.

It is an object of this invention to provide new chemical compounds in which an organo-substituted inorganic non-metallic element of Groups III–V of the Periodic Table is joined successively to C and N.

A particular object of this invention is the provision of new organophosphorus compounds.

Another object of this invention is the provision of new triazines having organo-substituted inorganic non-metallic ring substituents.

Another object is the provision of new polymeric materials.

Still another object is the provision of a novel method of converting the cyanides of organo-substituted inorganic non-metallic elements of Groups III to V of the Periodic Table into oligomers and high polymers.

These and other objects will become evident upon consideration of the following specification and claims.

It has now been found that cyanides of organophosphorus compounds can be homopolymerized and can be copolymerized with cyanides of organoboron and organosilicon compounds, forming polymers in which the repeating unit has the same empirical formula as the monomer, and the cyano group forms the linking bond.

The stated conversion can be effected in either of two ways.

One method, provided by this invention, is a catalytic reaction, consisting of contacting the reaction mixture comprising an organophosphorus cyanide with an ionic catalyst. The catalyzed conversion can be carried out at atmospheric pressures.

A second method, provided by this invention, consists in heating the reaction mixture comprising an organophosphorus cyanide under elevated pressure, such as pressures above 1000 kg./sq. cm. The high pressure conversion will take place in the absence of a catalyst.

Surprisingly, the stated high pressure condensations proceed without any considerable decomposition of the starting materials. When tricyanophosphine is heated under pressure, it loses nearly all its N content to give a solid containing C and P. Metallic cyanides react similarly: anhydrous lithium cyanide at 400° C. and 25,000 kg./sq. cm. decomposes suddenly, yielding C and N; and mercuric cyanide likewise, decomposes at elevated temperatures and pressures to a black solid from which elemental mercury can be removed in high vacuum on heating. The presently employed organo-substituted phosphorus, silicon and boron cyanides, however, instead condense without loss of elements, to form oligomers and higher polymers, in which the repeating unit has the same empirical formula as the monomer.

Copolymerization with the organophosporus cyanides is a method of producing polymers from cyanides which resist homopolymerization. Thus, the organoboron cyanides, which are particularly strongly coordinated in the monomeric state, are not converted to solid polymers on exposure to heat and pressure. However, polymers including organoboryl substituents are found to be obtained under such conditions when the organoboron cyanides are copolymerized with the organophosphorus cyanides.

In studies of the condensation of organic nitriles to oligomers such as triazines under elevated temperatures and pressures, especially at reasonably accessible pressures, below 10,000 atmospheres, it has usually been found necessary to catalyze the reaction, using anionic catalysts such as ammonia or amine, for example. With the present organo-substituted boron, silicon and phosphorus cyanides, on the other hand, no catalyst is found necessary to produce the condensation upon application of elevated temperatures and pressures, and indeed, use of a basic catalyst has been found unfavorable to the high pressure polymerization.

The products of the methods of this invention are organophosphorus homopolymers and copolymers in which organo-substituted elements selected from the group consisting of P, B and Si are joined successively to C and N. The term, polymer, is used herein to designate homo- and copolymers, including both oligomers and higher polymers. An oligomer is a low molecular weight polymer, which is formed of repeating units but which has a low molecular weight, below 1500, say. The presently provided oligomers include triazines, such as phosphinotriazines, of the formula

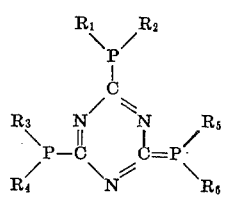

where each R (each of $R_1$, $R_2$, $R_3$ and so forth) is an organic radical. Higher molecular weight polymers, which may be designated poly(nitrilomethylidynes)

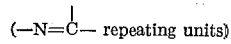

are also produced, such as phosphorus-substituted polymers of the formula

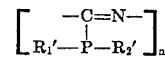

where $R_1'$ and $R_2'$ are organic radicals and $n$ is an integer greater than 3.

The uses of the presently provided novel products are various, depending upon their nature. The oligomeric products such as triazines in some cases are fluids over a wide temperature range, and may be used as functional fluids, for heat or power transfer, lubrication or the like. Thermal stability is a characteristic of the presently provided products. The high polymers generally neither soften nor decompose at temperatures up to 300–400° C., and can be sintered to provide heat-stable rigid materials of construction. The presently provided triazines soften and plasticize the polymers, providing readily moldable compositions from which shaped structural forms can be produced, or which can be applied to surfaces such as glass to provide an adherent opaque paint-like coating; the waxy mixtures of these oligomers and higher polymers can also be employed as dielectric materials, and so forth.

Referring now in more detail to the practice of this invention, the presently useful monomeric starting materials include phosphorus cyanides of the formula $$(R)_a P(=X)_c (C\equiv N)_b$$

where X is a chalkogen element having an atomic weight below 35, $a$ and $b$ are the integers 1 or 2 and the sum of $a$ and $b$ is 3, and $c$ is the integer 0 or 1. The stated phosphorus cyanides produce polymeric products having substituents of the formula $$(R)_a P(=X)_c (\overset{|}{C}N)_b$$

in which R, X, $a$, $b$ and $c$ are as defined above.

Cyanides of organo-substituted inorganic non-metallic elements which can be copolymerized with the stated organophosphorus cyanides include cyanoboranes of the formula $$(R)_{a'} B(C\equiv N)_{b'}$$

in which $a'$ and $b'$ are integers with a value of at least 1, and the sum of $a'$ and $b'$ is 3. This produces polymeric products including as substituents groups of the formula $$(R)_{a'} B(\overset{|}{C}N)_{b'}$$

where $a'$ and $b'$ are defined as just stated. Also susceptible to copolymerization by the present process are cyanosilanes of the formula $$(R)_{a''} Si(C\equiv N)_{b''}$$

in which $a''$ and $b''$ are integers with a value of at least 1 and the sum of $a''$ and $b''$ is 4. This produces polymeric products including as substituents groups of the formula $$(R)_{a''} Si(=X)_c (\overset{|}{C}N)_{b''}$$

in which $a''$ and $b''$ are defined as just stated.

In the stated formulas, each R may be the same or different and is a radical consisting of elements selected from the class consisting of C, H and O, said O being ether oxygen, linking adjoining C atoms, free of aliphatic (olefinic or acetylenic, carbon-to-carbon) unsaturation and containing up to 12 carbon atoms and up to 1 oxygen atom. In general, the presently employed cyano compounds are known in the art or may be prepared by methods analogous to those known in the art; reference may be made in this connection, for example, to my co-pending concurrently filed application S.N. 459,931 for the (phenoxyphenyl)phenylphosphine cyanides. Preferably R is an aromatic radical bonded by a benzene ring carbon atom to the inorganic element, such as phenyl or phenoxyphenyl.

The phosphorus cyanides useful as starting materials for the practice of the present invention include cyanodiorganophosphines of the formula $(R)_2 P(C\equiv N)$, dicyanoorganophosphines of the formula $R-P(C\equiv N)_2$ and the corresponding oxides and sulfides, of the general formula $$(R)_a \overset{X}{\underset{\parallel}{P}} (C\equiv N)_b$$

where X is S or O, $a$ and $b$ are each 1 or 2, and their sum is 3.

Exemplary of presently useful cyanodiorganophosphines are dihydrocarbyl and bis(hydrocarbyloxyhydrocarbyl) phosphines such as cyanodiethylphosphine,
cyanodimethylphosphine,
cyanodiisopropylphosphine,
cyanodibutylphosphine,
cyanodiphenylphosphine,
cyano bis(p-phenoxyphenyl)phosphine,
cyanodihexylphosphine,
cyanodiheptylphosphine,
cyanobis(2-ethyl-hexyl)phosphine,
cyanodioctylphosphine,
cyanobis(m-butoxyphenyl)phosphine,
cyanoethylmethylphosphine,
butylcyanoisopropylphosphine,
cyanoethyl(2-ethylhexyl)phosphine,
cyanodinaphthylphosphine,
cyanomethylphenylphosphine,
cyano(phenoxyphenyl)phenylphosphine,
cyanodi-p-tolylphosphine,
cyanobis(p-ethylphenyl)phosphine,
cyanobis(isopropylphenyl)phosphine,
cyanobis(isopropoxyphenyl)phosphine,
cyanodibenzylphosphine,
benzylcyanoethylphosphine,
cyanodicyclopentylphosphine,
cyanodicyclohexylphosphine,
cyanobis(cyclohexylcyclohexyl)phosphine,
cyanoisopropylphenylphosphine,
benzylcyanophenylphosphine,
cyanodicyclopropylphosphine,
cyanobis(2-phenylethyl)phosphine,
cyanobis(2-phenoxyethyl)phosphine,
cyanoethyl(p-ethylbenzyl)phosphine,
cyanocyclohexylphenylphosphine,
cyanocyclohexyl(phenoxyphenyl)phosphine,
cyanomethyl(2-methylcyclopentyl)phosphine,
cyanobis(p-biphenylyl)phosphine,
cyanodifurfurylphosphine and so forth.

The dicyanoorganophosphines which may be converted to higher molecular weight products in accordance with this invention include dicyanohydrocarbylphosphines and dicyano(hydrocarbyloxyhydrocarbyl)phosphines such as dicyanophenylphosphine,
dicyano(phenoxyphenyl)phosphine,
dicyanoethylphosphine,
dicyanobutylphosphine,
dicyanocyclohexylphosphine,
dicyanocyclopentylphosphine,
dicyanobenzylphosphine,
dicyano-p-tolylphosphine,
dicyano-p-butoxyphenylphosphine,
dicyano(2-ethylhexyl)phosphine,
dicyano(p-isopropoxybenzyl)phosphine,
dicyano(p-isopropylphenyl)phosphine,
dicyanooctylphosphine,
dicyano(furyl)phosphine,
dicyano(o-ethylbenzyl)phosphine,
dicyano(2-[p-butylphenoxy]ethyl)phosphine,
dicyanoisobutylphosphine,
dicyanopentylphosphine,
dicyanoxylylphosphine,
dicyano(phenoxyhexyl)phosphine,
dicyanohexylphosphine and the like.

Exemplary of the presently useful cyanoorganophosphine chalkogenides are cyanodiphenylphosphine sulfide,
cyanobis(phenoxyphenyl)phosphine sulfide,
cyanodiphenylphosphine oxide,
cyanobis(phenoxyphenyl)phosphine oxide,
cyanodiethylphosphine sulfide,
cyanodimethylphosphine sulfide, cyanodicyclohexylphosphine sulfide,
cyano(phenoxyphenyl)phenylphosphine sulfide,
cyanodibenzylphosphine sulfide,
cyanodi-p-tolylphosphine sulfide,
cyanobis(2-ethylhexyl)phosphine oxide,
cyanobenzylethylphosphine sulfide,
cyano(p-isopropylphenyl)butylphosphine sulfide,
cyanooctylphenylphosphine oxide,
cyanobis(2-ethylbenzyl)phosphine oxide,
cyanoisobutyloctylphosphine sulfide,
cyanodipentylphosphine sulfide,
cyanocyclohexylphenylphosphine sulfide,
cyanodixylylphosphine oxide,
cyanoethylmethylphosphine sulfide,
cyanobis(3,3-dimethylbutylphenyl)phosphine sulfide,
cyanodiindenylphosphine sulfide,
cyanodifurylphosphine oxide,
cyanodibiphenylylphosphine sulfide; and
dicyanophenylphosphine sulfide,
dicyano(phenoxyphenyl)phosphine sulfide,
dicyanophenylphosphine oxide,
dicyano(phenoxyphenyl)phosphine oxide,
dicyanomethylphosphine sulfide,
dicyano-p-t-butylphenylphosphine sulfide,
dicyanocyclohexylphosphine sulfide,
dicyanobutylphosphine oxide,
dicyano(2-ethylbenzyl)phosphine oxide,
dicyano(2-methylcyclopentyl)phosphine sulfide,
dicyano(cyclohexyl)phosphine sulfide,
dicyano(furfuryl)phosphine oxide and the like.

In general, aromatic radicals in which a ring carbon atom is linked to the phophorus atom are preferred for thermal stability of the products, and particularly organic radicals having no $CH_2$ or CH radicals. The monocyanophosphorus compounds, and of the monocyanophosphines, the monocyanophosphine sulfides are especially preferred monomers.

The presently useful organoboron cyanides include, for example, cyanodiphenylborane, cyano(phenoxyphenyl)phenylborane, cyanoethylmethylborane, cyanomethylphenylborane, cyanobis(phenoxyphenyl)borane, cyanodi-p-tolylborane, cyanodicyclohexylborane, cyanodicyclopentylborane, cyanodibenzylborane, cyanobis(2 - phenylethyl)borane, cyanobis(2-phenoxyethyl)borane, cyanodibutylborane, cyanodimethylborane, cyanodiisopropylborane, cyano(2-methylcyclopentyl)pentylborane, cyanodiisoctylborane, cyanodicyclohexylborane, cyanodifurylborane, cyanodiindenylborane, dicyanophenylborane, dicyano(phenoxyphenyl)borane, dicyanomethylborane, and the like.

The organosilane cyanides which can be converted to higher molecular weight products by the method of this invention include dicyanodiorganosilanes such as diphenyldicyanosilane, (phenoxyphenyl)phenyldicyanosilane, bis(phenoxyphenyl)dicyanosilane, diethyldicyanosilane, dibutyldicyanosilane, dioctyldicyanosilane, bis(ethoxyphenyl)dicyanosilane, ethyl(2-ethylhexyl)dicyanosilane, methylphenyldicyanosilane, methyl(phenoxyphenyl)dicyanosilane, benzyldicyanophenylsilane, di-p-biphenylyldicyanosilane and the like, and cyanotriorganosilanes and tricyanoorganosilanes such as cyanotriphenylsilane, cyanotris(phenoxyphenyl)silane, cyanotrimethylsilane, cyanotriethylsilane, cyanotris(2-ethoxyethyl)silane, cyanotri-t-butylsilane, cyanotriisopropylsilane, cyano(ethoxyethyl)diethylsilane, cyano-tri-p-tolylsilane, cyanotri-2,4-xylylsilane, cyanobis(phenoxyphenyl)phenylsilane, cyanotrinaphthylsilane, cyanotridodecylsilane, cyanotri-p-biphenylylsilane, cyanodi(biphenylyl)phenylsilane, tricyanomethylsilane, tricyanophenylsilane, tricyano(phenoxyphenyl)silane, tricyano(p-t-butylphenyl)silane, tricyano(p-isopropoxyphenyl)silane, tricyanocyclohexylsilane, tricyanobenzylsilane and so forth.

The presently provided polymers may be generally designated polynitrilomethylidynes; specifically, they are poly(phosphino-, poly(phosphinothioyl-, and poly(phosphinylnitrilomethylidynes), which may or may not include boryl- and silylnitrilomethylidyne groups. The trimeric species of the products are triazines, viz., phosphino-, phosphinothioyl-, and phosphinyltriazines, which may or may not include boryl and silyl substituents. The other polymeric species may also be cyclic, but this is not established. The various phosphorus-containing, silyl and boryl substituents of the polymeric products will be of the formulas stated above, that is, $$(R)_aP(=X)_c(CN)_{b'}(R)_{a'}B(CN)_{b'}$$

and $(R)_{a''}Si(CN)_{b''}$. The infrared spectra of polymers obtained from polycyano compounds in accordance with this invention are free of the absorption characteristic of cyano groups, so that the indicated possible residual CN groups are considered as also linked into the polymeric structures as nitrilomethylidyne groups. The presently contemplated copolymers of the phosphorus cyanides with the boron, silicon or boron and silicon cyanides are characterized by inclusion of at least sufficient of each of a phosphorus-containing substituent and a substituent selected from a boryl and a silyl substituent to differentiate the copolymers significantly from the respective homopolymers of the cyanides; in general, 5–95 mole percent of the substituents will be a phosphorus-containing substituent of the above-stated formula.

*Conversion conditions*

The present conversion of organo-substituted Group III to V element cyanides can be accomplished under varying conditions. Various pressures and temperatures can be used, and catalysts and solvents may or may not be present in the reaction mixture.

Essentially, effecting the reaction requires maintaining the organo-substituted inorganic Group III–V element cyanide either in contact with a catalyst or under elevated pressures until conversion to polymer has occurred.

Either the individual cyanides or mixtures of the presently useful organo-substituted inorganic cyanide reactants may be employed in the present procedures. The organophosphorus cyanides can be homopolymerized or can be copolymerized either with each other or with the organoboron and organosilicon cyanides. The organophosphorus cyanide content will be at least 5 mole-percent of the total organo-substituted inorganic Group III-V element cyanide content of the reaction mixture, and may be greater, up to 95 mole-percent in the presently provided copolymers of P with B and Si, and 100 mole-percent in the homopolymers.

Temperatures used may vary from down to where the reaction mixture is barely liquid up to any temperature below decomposition temperatures of the reaction mixture components. The rapidity of the reaction will vary with the reactants chosen, and in some cases the reaction may be exothermic and require cooling and/or diluents to moderate its violence, while other reactants may not undergo significant conversion until after hours at elevated temperatures. Suitable temperatures for carrying out the conversion are generally in the range of about 25° to 125° C., in the case of the catalyzed polymerization. In high pressure polymerizations in accordance with this invention, the temperature and pressure required for the conversion are usually interdependent. In general, the higher the pressure, the lower the temperature required to initiate the polymerization, and the higher the temperature, the lower the pressure. Preferably, temperatures above about 200° C. are employed in the high pressure polymerizations conducted in the absence of catalyst. The conversion is accelerated by elevating the temperature, and frequently for practicable reaction rates at reasonably low pressures, temperatures of 250° C. and above may be used.

The pressures at which the present polymerization is conducted may range from subatmospheric pressures, down to say about 0.5 mm. Hg, to superatmospheric pressures, up to above about 1000 kg./sq. cm. and preferably, above about 5000 kg./sq. cm. The catalyzed polymerization method of the present invention can be carried out at the lower pressures, below 1000 kg./sq. cm. if desired. Since this embodiment of the present invention can be conducted at about atmospheric pressure, the use of such pressure is generally advantageous in this connection. To produce polymerization of the organo-substituted inorganic cyanides at practicable rates in the absence of a catalyst, elevated pressures must be employed, at least above about 1000 kg./sq. cm. and preferably above about 5000 kg./sq. cm. Higher pressures, ranging up to 20,000 kg./sq. cm. or more, can be used if desired.

Catalysis of the present polymerization is produced by contacting the organo-substituted inorganic cyanide with an ionic catalyst, and more particularly, with anhydrous lithium cyanide. The amount of lithium cyanide used to produce the polymerization may be merely a catalytic amount, which may be very small, such as 0.01 mole per mole of the monomer, say, though greater amounts may also be used if desired. While the use of LiCN catalyst at about atmospheric pressure has been found effective in producing the polymeric products of this invention, and especially the polymers of the organo-substituted phosphorus compounds, use of an ionic catalyst such as diethylamine at elevated pressures, above about 5000 kg./sq, cm., has actually been found disadvantageous. Since the exposure to elevated pressure alone produces the desired polymerization, the presence of catalysts in practicing the high pressure embodiment of the present invention is unnecessary in any case.

The organo-substituted inorganic cyanides may be heated and catalyzed or compressed to effect their condensation alone or in the presence of solvents. Use of solvents is generally desirable.

Useful solvents include hydrocarbon solvents such as benzene, toluene and xylene, hexane, pentane, and cyclohexane; oxygenated solvents including ethers such as diethyl ether, dioxane, and the dimethyl ether of ethylene glycol; amides such as dimethylformamide, dimethylacetamide and so forth; nitriles such as acetonitrile, tertiary amine bases such as pyridine and triethylamine; sulfoxides such as dimethyl sulfoxide; and so forth.

The time required to accomplish the reaction depends on functional factors such as the reactivity of the reactant, the temperature and pressure of reaction and so forth. Reaction rates and times of reaction may vary considerably also depending on the details of apparatus and other operational conditions. By suitable arrangements, continuous procedures may be employed, or batch type operations.

On completion of the reaction, the polymer formed in the reaction is separated by conventional methods such as precipitation, vaporization, distillation, extraction and the like.

The invention is illustrated but not limited by the following examples.

Example 1

This example illustrates conversion of an organophosphine dicyanide to a higher molecular weight product of the same empirical formula.

The bomb used for the polymerization is one useful for the pressure range up to 10,000 kg./sq. cm. It is 0.75 inch I.D., 3 inch O.D., 4 inch long, and provided with Bridgman leakproof closures. Heating is accomplished by means of an electrically heated jacket around the bomb. A dial gauge meaures relative motion of the upper piston with respect to the lower plug, giving a measure of the volume changes during compression and chemical reaction. The bomb and plugs are made of red hard tool steel, heat treated for maximum toughness, with a Rockwell C hardness number of 53–54.

A solution of 2.5 grams (g.) of dicyanophenylphosphine in 2.5 g. of benzene in a lead tube is put in the cylinder and surrounded by oil. Pressure in the cylinder is raised to 7600 kg./sq. cm. (kilograms per square centimeter) and the cylinder is heated to 260° C. No thermal effect is observed and no change in volume. After cooling, the lead capsule is removed and cleaned. Its weight has not changed.

The contents of the capsule are black and on filtration yield a very fine, black powdery solid. The powder is washed with benzene and petroleum ether and vacuum dried at 60° C. The product corresponds to 25% of the phosphine used, and has the same empirical formula as the starting compound. The infrared spectrum shows the complete absence of —C≡N groups.

When the reaction is repeated using 5 g. of dicyanophenylphosphine and 12 g. of benzene directly in the steel cylinder, without the use of a collapsible tube, with the charge maintained at 265–275° C. and 7600 kg./sq. cm. for 33 minutes, again, while no thermal effect is observed, a 20% yield of the same black ploymer is obtained.

Example 2

This example illustrates preparation of polymers from a diorganophosphine cyanide.

Using the same apparatus and technique as in the above experiment, a charge consisting of a solution of 7 g. of diphenylcyanophosphine in 12 g. of benzene is compressed in the steel cylinder (without use of a collapsible container to 7700 kg/sq. cm. and heated to 265° C. for one hour. The reuslting black liquid yield 0.1 g. of a dark brown solid having nearly the same nitrogen and phosphorus content as the starting compound, and melting at 200–210° C.

When the preparation is repeated using 7 g. of diphenylcyanophosphine without solvent in a collapsible lead tube and subjecting it to 7600 atmospheres at 285° C. for two hours, there is a steady decrease in volume, and complete condensation occurs, yielding a hard black solid.

When this condensation product is exhaustively extracted with benzene in a Soxhlet apparatus, it yields a benzene-insoluble fraction (55%) and a benzene-soluble fraction (45%). The benzene-soluble solid is the cyclic trimer, tris(diphenylphosphino) triazine, of the formula

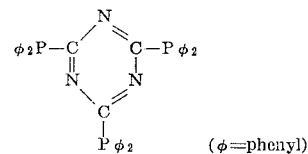

($\phi$=phenyl)

It has a measured average molecular weight of 714 in benzene compared with 633 calculated for the cyclic trimer.

The benzene-insoluble fraction is a higher molecular weight compound consisting of repeating units of the same empricial formula as the monomer.

The condensation products of the cyanophosphines are more stable toward oxidation and hydrolysis than are the cyanophosphines themselves: the polymers are stable in moist air while the cyano compounds hydrolyze, producing HCN.

Example 3

This example illustrates preparation of polymers from another organophosphorus compound.

Cyanodiphenylphosphine sulfide is prepared by charging a reaction flask with 63 g. of cyanodiphenylphosphine (0.3 mole), and adding 51 g. (0.3 mole) of phosphorous thiochloride, under nitrogen. The mixture is heated at 105° C. until evolution of phosphorus trichloride has ceased. The product vacuum-distilled from the resulting reaction mass at 149–151° C. at 0.25 millimeter (mm.) Hg pressure is cyanodiphenylphosphine sulfide. Characteristics of the liquid product are $n_D^{20}$ 1.6414, $d_4^{25}$ 1.2023. On standing, the compound solidifies to a white solid, M. 50.0–50.2° C.

High pressure condensation of the cyanodiphenylphosphine sulfide is carried out at 7600 kg./sq. cm. and about 250° C. The reaction is followed by observing the decrease in volume. Less than 13 minutes are required for complete reaction. The hard, black, brittle product becomes tough and resinous at about 100° C. and melts to a black viscous liquid at higher temperatures.

Analysis of the product, without further treatment, gives:

Calc'd for $C_{13}H_{10}NPS$: C, 64.18; H, 4.14; N, 5.76; P, 12.75; S, 13.18. Found percent: C, 64.33; H, 4.35; N, 5.75; P, 12.53; S, 13.11.

The agreement shows that no decomposition occurs during the condensation.

Extraction of the product with benzene yields 49% of a black, insoluble residue analyzing 13.3% P, 6.5% N, and 13.9% S. The infrared spectrum shows the complete disappearance of the $-C \equiv N$ group at 2180 cm.$^{-1}$. This insoluble polymer does not melt or decompose even at 360° C. and appears to be completely heat-stable, but softens at 310–320° C. On compression and heating at 4000 kg./sq. cm. and 300° C., it sinters to a hard, coherent cylinder having a density of 1.2 grams per cubic centimeter.

The benzene-soluble part is recovered by precipitation with petroleum ether and drying in vacuum. It is 51% of the original and analyzes 12.99% P, 4.24% N and 12.98% S. This fraction behaves like a tough, adhesive wax. It softens like a wax on gentle heating and slowly melts at below 150° C. to a very viscous black liquid. This liquid is not volatile and is heat-stable to temperatures above 300° C.

Some of this soluble fraction is melted, poured into a collapsible lead tube, and returned to the high pressure bomb, where it is heated again to 280° C. at 7600 kg./sq. cm. for 1 hour. The melting behavior is again observed and found to be unchanged.

The benzene-soluble fraction has an observed molecular weight of 700 compared with the value of 729 calculated for the trimer. The analysis and molecular weight are consistent with identification of the product as tris(diphenylphosphinothioyl) triazine, with the structure

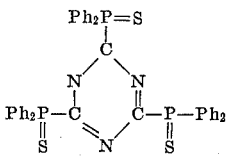

The infrared spectrum of the trimer shows the disappearance of the $C \equiv N-$ band at 2180 cm.$^{-1}$, and the appearance of a $-C=N-$ band.

When diethylamine is used as catalyst for conversion of cyanodiphenylphosphine sulfide to polymer at elevated pressure, the product obtained at 255° C. and 7600 kg./sq. cm., containing the trimeric triazine product, includes less high polymer, with only 15% insoluble in benzene.

Example 4

This example illustrates preparation of a polymer from an organoboron cyanide by copolymerization with an organophosphorous cyanide.

Equal molar quantities of cyanodiphenylphosphine and cyanodiphenylborane are mixed, forming a homogeneous liquid which is sealed in a collapsible lead capsule and compressed as described above at 7600 kg./sq. cm. and 285–300° C. A slow change in volume occurs. After 7¼ hours, the bomb is cooled and the capsule recovered. Its weight is the same as before the experiment. The product is a nearly black solid.

A larger sample, 13.5 g. of the equimolar mixture, is compressed directly in the steel bomb without use of the collapsible tube, in the presence of an internal thermocouple, at 7600 kg./sq. cm. at 300° C. The thermocouple record shows no thermal effect after operating conditions have been established. The dial gauge shows a slow but continued volume decrease over a period of 5 hours.

The product is recovered as a black solid. It is stable in air. Extraction with benzene removes some brown-colored material, which is not unreacted cyanodiphenylborane: it does not yield aminoethyldiphenylborinate on reaction with ethanolamine.

The black condensation product, after thorough extraction with benzene, and vacuum drying, analyzes as follows.

Calc'd for $C_{26}H_{20}N_2PB$: C, 77.83; H, 5.02; N, 6.98; P, 7.33; B, 2.83. Found percent: C, 68.68; H, 4.78; N, 5.85; P, 9.19; B, 1.68.

This product is completely stable at 360° C.

Example 5

This example illustrates another preparation of a polymeric product from an organoboron cyanide, by copolymerization with a cyano-substituted organophosphine sulfide.

A mixture of 4.2 g. of cyanodiphenylphosphine sulfide (M.P. 50.2° C.) and 3.3 g. of cyanodiphenylborane (M.P. 119–125° C.) (both colorless compounds) is melted to form a viscous, deep-red liquid that remains liquid on cooling to room temperature, crystallizing only after a half hour. The liquid is poured into a collapsible lead tube, which is sealed and pressurized under oil in the high pressure apparatus. No volume change can be observed as the pressure is maintained at 7600 kg./sq. cm. and 260–300° C. for 1.5 hours. The sample is found to have polymerized to a hard, black mass.

Example 6

This example illustrates preparation of a higher molecular weight product from an organosilicon cyanide.

The preparation of dicyanodiphenylsilane described by McBride (J. Org. Chem. 24 (1959) 2029) is followed, producing a water-white liquid which boils at 122° C./0.24 mm. ($n_D^{20}$ 1.5625 and $d_4^{26}$ 1.1067). The calculated molar refraction shows it to be the normal cyano compound although the infrared spectrum indicates that it might contain both cyano and isocyano groups. The compound can be separated by vapor phase chromatography into two fractions whose infrared spectra show a marked difference in relative intensity of the bands at 2180 and 2260 cm.$^{-1}$.

Exposure of an equimolar mixture of this clear colorless liquid dicyanodiphenylsilane preparation with cyanodiphenylphosphine sulfide to 7600 kg./sq. cm. pressure and 253° C. yields a black, soft, adherent wax. The infrared spectrum shows disappearance of the $-C \equiv N$ groups.

Example 7

This example illustrates conversion of an organophosphorus cyanide to a polymer at atmospheric pressure using an ionic catalyst.

A 100-ml., single-necked round-bottomed flask fitted with reflux condenser with $CaCl_2$ drying tube atop is charged with chlorodiphenylphosphine oxide (23.6 g. 0.1 mole, B.P. 168–9° C./1.2 mm., $n_D^{20}$ 1.6112) and anhydrous lithium cyanide (3.3 g., 0.1 mole, M.P. 161° C.) in 30 ml. of benzene. After refluxing overnight, the reaction mixture is filtered by nitrogen pressure into a distillation apparatus. A forerun of 5.6 g. of liquid obtained at 156–159° C./1.2 mm. ($n_D^{21}$ 1.6090) is impure starting material: the undistillable brown-black residue, weighing 13.9 g., fusing in the 60–70° C. range, is a polymer of cyanodiphenylphosphine oxide such as tris(diphenylphosphinyl)triazine.

*Analysis.*—Calc'd for $C_{13}H_{10}NOP$: C, 68.72; H, 4.44; N, 6.17; P, 13.63; O, 7.04. Found, percent: C, 67.18; H, 4.86; N, 5.83; P, 13.52, O (by diff.), 8.61.

Example 8

This example illustrates preparation of another organophosphorus cyanide polymer.

Following a procedure as described in Example 2, (p-phenoxyphenyl)phenylphosphinothioic cyanide is subjected to a pressure of 7500 atmospheres at 275° C. for two hours. A quantitative yield (6.7 g) of a jet-black condensation product with M.P. about 75° C. is recovered from the lead capsule. This dissolves completely in warm benzene (50 ml.). Addition of petroleum ether to the cooled benzene solution precipitates a dark brown solid (3.4 g. after filtering and drying). This fraction melts at 120–130° C. A molecular weight determination by the freezing point depression of benzene gives a value of 1635; since the monomer has a molecular weight of 335, the degree of polymerization is about 4.9.

For the preparation of (p-phenoxyphenyl)phenylphosphinothioic cyanide (cyano(phenoxyphenyl) phenylphosphine sulfide), 100 g. of p-phenoxyphenylphosphonous dichloride is heated wiht 50 g. of diphenylmercury at 210–215° C., under nitrogen, for 4 hours. The cooled reaction mixture is triturated with ligroin, filtered, and distilled to recover (p-phenoxyphenyl)phenylphosphinous chloride, B. 162–4°/0.07 mm., $n_D^{25}$ 1.6472. Overnight reflux of 31 g. of the stated chloride with 15 g. of AgCN in 125 ml. of anhydrous benzene is followed by decanting the supernatant layer and distilling to recover (p-phenoxyphenyl)phenylphosphinous cyanide, B. 168–70° C./0.05 mm., $n_D^{25}$ 1.6353. Heating 43 g. of the stated cyanide with 26 g. of phosphorus thiochloride at 1400° C. until $PCl_3$ evolution ceases and distillation of the residue yields cyano(p-phenoxyphenyl)phenylphosphine sulfide, B. 174–6° C./0.02 mm., $n_D^{25}$ 1.6576.

For production of a polynitrilomethylidyne polymer such as a triazine with mixed phosphorus-containing substituents, a mixture of cyano(p-phenoxyphenyl)phenylphosphine sulfide and cyanodiphenylphosphine sulfide is heated under pressure as desrcibed in Example 2.

While the invention has been described with specific reference to particular preferred embodiments thereof, it will be appreciated that modification and variation can be made within the scope of the appended claims without departing from the invention, which is limited only as defined n the appended claims.

What is claimed is:

1. The method of converting an organophosphorus cyanide to a polymer containing repeating units of the same empirical formula as the initial monomer which comprises contacting anhydrous lithium cyanide in an organic solvent with an organophosphorus cyanide of the formula

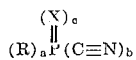

in which R is an organic radical consisting of elements selected from the class consisting of C, H and O, said O being ether oxygen, linking adjoining C atoms, free of aliphatic unsaturation and containing up to 12 carbon atoms and up to 1 oxygen atom, X is a chalkogen element with an atomic weight below 35, $a$ and $b$ are the integers 1 or 2 and the sum of $a$ and $b$ is 3, and $c$ is the integer 0 or 1.

2. The method of producing a poly(nitrilomethylidyne) containing organoboryl substituents which comprises heating and compressing a mixture of an organoboron cyanide of the formula $(R)_{a'}B(C{\equiv}N)_{b'}$ in which $a'$ and $b'$ are integers each with a value of at least 1, and the sum of $a'$ and $b'$ is 3, and an organophosphorus cyanide of the formula $(R)_aP(=X)_c(C{\equiv}N)_b$ in which X is a chalkogen element with an atomic weight below 35, $a$ and $b$ are the integers 1 or 2 and the sum of $a$ and $b$ is 3, $c$ is the integer 0 or 1, each R is an organic radical consisting of elements selected from the class consisting of C, H and O, said O being ether oxygen, linking adjoining C atoms, free of aliphatic unsaturation and containing up to 12 carbon atoms and up to 1 oxygen atom; provided that at least 5 mole-percent of said mixture of cyanides is an organophosphorus cyanide of said formula; at a pressure above about 1000 kg./sq. cm. and a temperature above about 200° C.

3. The method of producing a polymeric product containing organophosphino and organoboryl substituents which comprises compressing and heating a mixture of cyanodiphenylborane and cyanodiphenylphosphine at a temperature above about 200° C. and a pressure above about 1000 kg./sq. cm.; provided that at least 5 mole-percent of said mixture is cyanodiphenylphosphine.

4. The method of producing a polymeric product containing organophosphinothioyl and organoboryl substituents which comprises compressing and heating a mixture of cyanodiphenylborane and cyanodiphenylphosphine sulfide at a temperature above about 200° C. and a pressure above about 1000 kg./sq. cm. provided that at least 5 mole-percent of said mixture is cyanodiphenylphosphine sulfide.

5. The method of producing a polymeric product containing organosilyl substitutents which comprises compressing and heating a mixture of an organosilane cyanide of the formula $(R)_{a''}Si(C{\equiv}N)_{b''}$ in which $a''$ and $b''$ are integers with a value of at least 1, the sum of which is 4, and an organophosphorus cyanide of the formula $(R)_aP(=X)_c(C{\equiv}N)_b$ in which X is a chalkogen element with an atomic weight of at least 35, $a$ and $b$ are the integers 1 or 2 and the sum of $a$ and $b$ is 3, $c$ is the integer 0 or 1, and each R is an organic radical consisting of elements selected from the class containing of C, H and O, said O being ether oxygen, linking adjoining C atoms, free of aliphatic unsaturation and containing up to 12 carbon atoms and up to 1 oxygen atom; provided that at least 5 mole-percent of said mixture is an organophosphorus cyanide of said formula; to a temperature of above about 200° C. and a pressure of above about 1000 kg./sq. cm.

6. The method of producing a polymeric product containing organophosphinothioyl and organosilyl substituents, which comprises heating and compressing a mixture of dicyanodiphenylsilane and cyanodiphenylphosphine sulfide at a temperature of above about 200° C. and a pressure of above about 1000 kg./sq. cm.; provided that at least 5 mole-percent of said mixture is cyanodiphenylphosphine sulfide.

7. Tris(diorganophosphinothioyl)triazines in which the organic radicals are aromatic radicals which each consist of elements selected from the class consisting of C, H and O, said O being ether oxygen, linking adjoining C atoms, contain up to 12 aromatic carbon atoms and up to 1 oxygen atom and are free of aliphatic unsaturation.

8. Tris(diphenylphosphinothioyl)triazine.

9. A poly(nitrilomethylidyne) having dihydrocarbylphosphino and dihydrocarbylboryl substituents in which each hydrocarbon radical contains up to 12 carbon atoms and is free of aliphatic unsaturation; provided that at least 5 mole-percent of said substituents are dihydrocarbylphosphino subsituents.

10. A poly(nitrilomethylidyne) having diphenylphosphino and diphenylboryl substituents; provided that at least 5 mole-percent of said substituents are diphenylphosphino substituents.

11. A poly(nitrilomethylidyne) having diphenylphosphinothioyl and diphenylboryl substituents; provided that at least 5 mole-percent of said substituents are diphenylphosphinothioyl substituents.

12. A poly(nitrilomethylidyne) having a diphenylsilyl and diphenylphosphinothioyl substituent; provided that at least 5 mole-percent of said substituents are diphenylphosphinothioyl substituents.

References Cited

UNITED STATES PATENTS 3,165,513  1/1965  D'Alelio ........... 260—248

FOREIGN PATENTS 937,167  9/1963  Great Britain.

OTHER REFERENCES

Bengelsdorf: "Journal American Chemical Society," vol. 80 (1958), pp. 1442–4.

Cairns et al.: "Journal American Chemical Society," vol. 74 (1952), pp. 5633–6.

Hewertson et al.: "Journal of the Chemical Society," London, March 1963, pp. 1670–5.

SAMUEL H. BLECH, *Primary Examiner.*